ns Patent [19]

Roedel

[11] Patent Number: 4,476,291
[45] Date of Patent: Oct. 9, 1984

[54] RESINS CONTAINING β-PHENYLETHYL TRIFUNCTIONAL SILOXY UNITS AND METHOD FOR MAKING

[75] Inventor: George F. Roedel, Schenectady, N.Y.
[73] Assignee: General Electric Company, Waterford, N.Y.
[21] Appl. No.: 468,116
[22] Filed: Feb. 22, 1983
[51] Int. Cl.$^3$ ............................................. C08G 77/06
[52] U.S. Cl. ........................................ 528/14; 528/10; 528/12; 528/15; 528/31; 528/43; 428/447
[58] Field of Search .................. 528/10, 12, 25, 31, 528/14, 43; 428/447

[56] References Cited

U.S. PATENT DOCUMENTS

| | | | |
|---|---|---|---|
| 2,842,522 | 7/1958 | Frye | 260/46.5 |
| 2,954,390 | 9/1960 | Pike et al. | 260/448.2 |
| 3,846,358 | 11/1974 | Roedel | 260/18 S |
| 4,016,328 | 4/1977 | Horning | 525/477 |
| 4,029,635 | 6/1977 | Merrill | 528/10 |
| 4,160,858 | 7/1979 | Roedel | 528/14 |
| 4,239,877 | 12/1980 | Roedel | 528/10 |
| 4,417,069 | 11/1983 | Brown | 556/479 |

Primary Examiner—Herbert J. Lilling
Attorney, Agent, or Firm—Gary L. Loser

[57] ABSTRACT

A silicone resin comprising 100 parts by weight alkylsiloxane units selected from the group consisting of $RSiO_{1.5}$ units and $R^1R^2SiO$ units and mixtures thereof, wherein R, $R^1$ and $R^2$ are independently selected alkyl radicals having from 1 to about 8 carbon atoms, and from about 75 to about 2100 parts by weight β-phenylethylsiloxane units of the formula

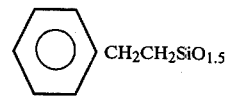

so as to provide a silicone resin which exhibits increased reactivity with organic compositions and which provides ultraviolet light and weathering resistance.

18 Claims, No Drawings

RESINS CONTAINING β-PHENYLETHYL TRIFUNCTIONAL SILOXY UNITS AND METHOD FOR MAKING

BACKGROUND OF THE INVENTION

The present invention relates to silicone resin compositions and methods for making such compositions. More particularly, the present invention relates to methods for making silicone resins from β-phenylethyltrichlorosilane and an alkylchlorosilane and silicone resin compositions made thereby.

The majority of silicone resins contain both alkyl and phenyl siloxane units. The presence of phenyl siloxane units is particularly important as they convey high heat resistance, oxidation resistance, toughness, air drying ability and compatibility with organic resins to such silicone resins. There are, however, applications for silicone resins that depend not on high heat resistance, oxidation resistance, and the like, but rather upon imparting ultraviolet light resistance and weather resistance to the final product. Most notable of such applications is the copolymerization of the silicone resin with an alkyd or polyester to form a paint vehicle.

Inasmuch as silicone resins containing phenyl siloxane units are relatively expensive, it is desirable to find substitutes therefor and methods for making such substitutes which are more cost efficient but which still provide the properties and characteristics for which the silicone resin was included, i.e. weatherability, UV light resistance, etc.

One substitute for phenyl siloxane units in silicone resins is phenylethylsiloxane units. It is well known that chlorosilanes having at least one silicon-bonded hydrogen atom can be added to styrene to obtain phenylethylchlorosilanes from which resins having phenylethyl siloxane units can be prepared. Generally such addition results in a mixture of various isomers. For example, in the addition reaction of trichlorosilane to styrene using a platinum catalyst some of the silicon-bonded hydrogen atoms of the silane molecules will attach to the carbon atom nearest the benzene ring while some of the silyl radicals of the silane molecules will attach to the carbon atom farthest from the benzene ring, and some of the silicon-bonded hydrogen atoms and silyl radicals will attach in the opposite positions. Accordingly, there results from such addition reaction a mixture of β-phenylethyltrichlorosilane and α-phenylethyltrichlorosilane. These reactions may be represented by the following equations, respectively:

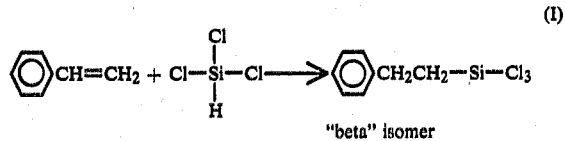

"beta" isomer

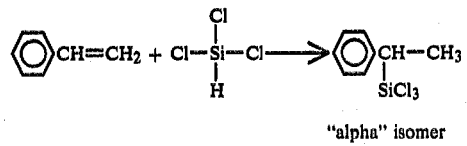

"alpha" isomer

In the normal course of such addition reaction there is produced a mixture containing approximately 60 weight percent β-phenylethyltrichlorosilane and 40 weight percent α-phenylethyltrichlorosilane. One disadvantage of such mixture of isomers is that resins made therefrom have a slow rate of reaction with alkyds or polyesters and thus renders it unsuitable as a substitute for phenyl units in paint vehicles and the like.

Brown in U.S. Pat. No. 4,417,069 assigned to the same assignee as the present invention, discloses a novel process for producing β-phenylethylchlorosilane. Briefly, such process comprises forming a mixture of styrene, a chlorosilane having at least one silicon-bonded hydrogen atom, a platinum catalyst and an effective amount of a tertiary amine as a position-directing agent and heating the mixture to effect addition of chlorosilane to the styrene.

Quite surprisingly, the present applicant has discovered that silicone resins formed from substantially 100% β-phenylethyltrichlorosilane and an alkylchlorosilane react with organic compositions, such as alkyds or polyesters much more rapidly than do silicone resins which are formed from mixtures of alpha and beta phenylethyltrichlorosilane and an alkylchlorosilane.

It is therefore an object of the present invention to provide silicone resins comprising β-phenylethylsiloxy units and alkylsiloxy units.

It is also an object of the present invention to provide a method of making silicone resins comprising β-phenylethylsiloxy units and alkylsiloxy units.

It is a further object of the present invention to provide silicone resins suitable for use in formulating paints and varnishes.

It is another object of the present invention to provide silicone resins which exhibit excellent resistance to weather and ultraviolet light.

It is still another object of the present invention to provide a process for producing silicone resins which exhibit increased reactivity with organic compositions.

Other objects and advantages of the present invention will become obvious from the following detailed description.

SUMMARY OF THE INVENTION

There is provided by the present invention a silicone resin composition comprising 100 parts by weight alkylsiloxane units selected from the group consisting of $RSiO_{1.5}$ units and $R^1R^2SiO$ units and mixtures thereof, wherein R, $R^1$ and $R^2$ are independently selected alkyl radicals having from 1 to about 8 carbon atoms, and from about 75 parts by weight to about 2100 parts by weight β-phenylethylsiloxane units of the formula

so as to provide a silicone resin which exhibits both good compatibility and increased reactivity with organic compositions such as alkyds and polyesters while also providing ultraviolet light and weathering resistance.

DESCRIPTION OF THE INVENTION

In accordance with the present invention a silicone resin is provided comprising from about 43 to about 95 weight percent β-phenylethylsiloxy units of the formula

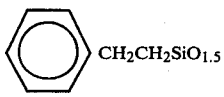

and from about 5 to about 57 weight percent alkylsiloxy units selected from the group consisting of $RSiO_{1.5}$ units and $R^1R^2SiO$ units and mixtures thereof, wherein R, $R^1$, and $R^2$ are independently selected alkyl radicals having from 1 to about 8 carbon atoms and wherein the sum of β-phenylethylsiloxy units and alkylsiloxy units equals 100 weight percent. Such compositions have been found to be extremely reactive with organic compositions as compared to prior art compositions formed from alkylchlorosilanes and a mixture of the alpha and beta isomers of phenylethyltrichlorosilane, for example, alkyds and polyesters, and hence are useful as intermediates in formulating paint vehicles and the like which exhibit excellent resistance to weathering and ultraviolet light.

It is believed that the method by which such silicone resins are formulated is not absolutely critical; however, resins prepared by the methods described in U.S. Pat. Nos. 3,846,358 and 4,160,858 have performed exceedingly well in laboratory experiments.

U.S. Pat. No. 3,846,358, assigned to the same assignee as the present invention and incorporated herein by reference, discloses a process for producing silicone resins comprising (a) contacting an organohalosilane selected from the class consisting of organotrihalosilanes and diorganodihalosilanes where the organo group is selected from the class consisting of monovalent hydrocarbon radicals, halogenated monovalent hydrocarbon radicals and cyanoalkyl radicals with water and an alcohol of the formula $R^3OH$ where $R^3$ is an alkyl radical of 1 to 8 carbon atoms such that there is formed an alkoxylated organosiloxane containing 5 to 50 percent by weight of alkoxy groups; (b) adding an alcohol of the formula $R^3OH$ where $R^3$ is as previously defined and removing acid from the alkoxylated organohalosiloxane by distillation or other procedures such that the resulting alkoxylated hydrolyzate has an acid concentration of 500 to 4000 parts per million; (c) adjusting the acidity of the alkoxylated organohalosilane by the use of a strong base or other means to an acid concentration in the hydrolysis medium of 5 to 300 parts per million; (d) adding water and an alcohol of the formula $R^3OH$ where $R^3$ is as previously defined to hydrolyze the alkoxylated organosiloxane and then by distillation or other means removing the water and adjusting the desired solids concentration of the resin in the alcohol solvent that is present, again by distillation or other evaporation procedure. Additionally, a solvent or solvents may be added to the silicone resin product that is dissolved in the alcohol by-product that is formed in the above hydrolysis procedure, such solvent being selected from the group consisting of toluene, xylene, benzene, cyclohexane, octane, heptane, butyl acetate, naphtha solvents and mineral spirits. The resulting mixture is heated at elevated temperatures so as to distill water from the silicone resin that is dissolved in the solvent and so as to adjust the resin solids in the solvent to the desired concentration. Such a silicone resin will have a hydroxyl content ranging from about 1.5 to 8 percent by weight.

U.S. Pat. No. 4,160,858, assigned to the same assignee as the present invention and incorporated herein by reference, discloses a process for producing a solventless silicone resin having a viscosity at 100 percent solids varying from 200 to 5000 centipoise at 25° C. Such process comprises (a) adding to organochlorosilanes of the formula $R_aSiCl_{4-a}$, where R is selected from the group consisting of alkyl radicals, cycloalkyl radicals, alkenyl radicals, aryl radicals and fluoroalkyl radicals, all having up to 8 carbon atoms, and mixtures thereof, where a is 1 or 2, from 0.05 to 0.2 part of water and from 0.1 to 1 part of an aliphatic alcohol of up to 3 carbon atoms per part of organochlorosilanes to form a silicone alkoxylate; (b) refluxing the alkoxylate; (c) inserting additional amounts of said aliphatic alcohol to said alkoxylate and removing said alcohol until the acid content of said alkoxylate is below 1000 parts per million; (d) adding an alkali metal hydroxide to said alkoxylate until its acid content does not exceed 100 parts per million; (e) adding water to said alkoxylate such that the amount of water that is added is from 0.2 to 0.8 moles of water per mole of hydrocarbonoxy radicals in said alkoxylate; and (f) heating said alkoxylate so as to complete the hydrolysis reaction with the additional water to obtain the desired resin product. Utilizing such process there is obtained a silicone resin product having an organo to silicon ratio that varies from 1.0 to 1.9:1, a silanol content that varies generally from 1 to 4 percent by weight, and a hydrocarbonoxy content that varies from 7 to 14 percent by weight.

In order to obtain the silicone resins of the instant invention, the starting materials must include per 100 parts by weight alkylchlorosilane, from about 75 parts by weight to about 1450 parts by weight β-phenylethyltrichlorosilane, or on a weight percent basis from about 7 to about 58 weight percent alkylchlorosilane and from about 42 to about 93 weight percent β-phenylethyltrichlorosilane. For the convenience of the reader it is pointed out that resins formed from the above ingredients will comprise per 100 parts by weight alkylsiloxane units, from about 75 to about 2100 parts by weight β-phenylethylsiloxane units, or on a weight percent basis, from about 5 to about 57 weight percent alkylsiloxane units and from about 43 to about 95 weight percent β-phenylethylsiloxane units.

The alkylchlorosilane is selected from silanes of the formula $RSiCl_3$, $R^1R^2SiCl_2$, and mixtures thereof, where R, $R^1$, and $R^2$ are independently selected from the group consisting of alkyl radicals having from 1 to about 8 carbon atoms. More preferably, the alkylchlorosilane is an alkyltrichlorosilane and most preferably is methyltrichlorosilane.

In the more preferred embodiments, there is included from about 40 to about 50 mole percent alkylchlorosilane and from about 50 to about 60 mole percent β-phenylethyltrichlorosilane.

Methods for making alkylchlorosilanes are known to those skilled in the art; however, methods for making β-phenylethyltrichlorosilane are not well known. U.S. Pat. No. 2,954,390 describes a method for producing β-phenylethyltrichlorosilane which comprises adding to styrene a chlorosilane having at least one silicon-bonded hydrogen atom in the presence of a platinum catalyst and tetrahydrofuran as a solvent. Because such method is not commercially useful, silicone resins have continued to be formed from phenyltrichlorosilanes rather than β-phenylethyltrichlorosilanes in order to obtain desirable properties such as weathering and ultraviolet light resistance.

Recently Brown in U.S. Pat. No. 4,417,069 assigned to the same assignee as the present invention, disclosed a novel and commercially useful method for preparing β-phenylethyltrichlorosilane. Briefly, Brown discloses that β-phenylethyltrichlorosilane can be prepared by mixing styrene, a chlorosilane having at least one hydrogen atom bonded to silicon, a platinum catalyst and an amount of tertiary amine effective for causing formation of β-phenylethylchlorosilane isomer, and heating such mixture in order to effect addition of the chlorosilane to styrene. The Brown disclosure, U.S. Pat. No. 4,417,069, is also incorporated by reference into the instant disclosure.

The present invention is based on the surprising discovery that silicone resins comprising β-phenylethylsiloxy units of the formula

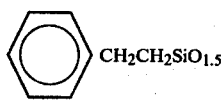

and alkylsiloxy units selected from the group consisting of $RSiO_{1.5}$ and $R^1R^2SiO$ units and mixtures thereof, where R, $R^1$, and $R^2$ are as previously defined, exhibit substantially improved reaction rates, as compared to prior art silicone resins formed from a mixture of the alpha and beta isomers of phenylethyltrichlorosilane, with alkyds and polyesters commonly used in formulating paints, varnishes and the like. As discussed more fully hereinabove, the silicone resins of the present invention comprise 100 parts by weight alkylsiloxane and from about 75 to about 2100 parts by weight β-phenylethylsiloxane groups, or on a weight percent basis, from about 5 to 57 weight percent alkylsiloxane groups and from about 43 to 95 weight percent β-phenylethylsiloxane groups. Preferably there is provided a resin having from 40 to 50 mole percent alkylsiloxane groups and from 50 to 60 mole percent β-phenylethylsiloxane groups. In the most preferred embodiment of the present invention there is provided a silicone resin comprising 60 mole percent β-phenylethylsiloxy units of the formula described above and 40 mole percent methylsiloxy units of the formula $CH_3SiO_{1.5}$. This results in a resin having optimal hardness and reactivity with organic compositions. In general, as the hydrocarbon chain length of the alkylchlorosilane increases, the hardness of the derived silicone-organo composition decreases.

The silicone resins of the present invention are particularly useful as intermediates which can be reacted with an alkyd or polyester to form a copolymer which may be utilized in formulating paints, varnishes and the like.

So that those skilled in the art might be better able to practice the present invention, the following examples are given by way of illustration and not by way of limitation.

EXAMPLES 1-7

A series of silicone resins was prepared according to the method described in U.S. Pat. No. 3,846,358 having ratios of phenylethylsiloxane to alkylsiloxane and β-phenylethylsiloxane to α-phenylethylsiloxane as shown in Table I.

TABLE I

| Example | Composition Mole % | Wt % | Cook Time (min.) w/Reference Alkyd |
|---|---|---|---|
| 1 | 75 phenylethyl T 25 hexyl T | 100β | 195 |
| 2 | 75 phenylethyl T 75 hexyl T | 68β/32α | 240 |
| 3 | 75 phenylethyl T 25 propyl T | 100β | 135 |
| 4 | 75 phenylethyl T 25 propyl T | 85β/15α | 170 |
| 5 | 75 phenylethyl T 25 propyl T | 60β/40α | 240 |
| 6 | 60 phenylethyl T 40 methyl T | 100β | 80 |
| 7 | 60 phenylethyl T 40 methyl T | 68β/32α | 85 |

As can be seen from Table I, the rate of reaction with a reference alkyd (i.e. cook time) is substantially faster when the silicone resin contains substantially 100% β-phenylethylsiloxy units rather than a mixture of α and β-phenylethylsiloxy units. Although the artisan would expect an increased reaction rate as the chain length of the alkylsiloxane decreased, it is quite unexpected that merely utilizing the beta isomer will substantially increased the reaction rate.

I claim:

1. A silicone resin composition substantially free of α-phenylethylsiloxy units comprising 100 parts by weight alkylsiloxane units selected from the group consisting of $RSiO_{1.5}$ units and $R^1R^2SiO$ units and mixtures thereof, wherein R, $R^1$ and $R^2$ are independently selected alkyl radicals having from 1 to about 8 carbon atoms, and from about 75 parts by weight to about 2100 parts by weight β-phenylethylsiloxane units of the formula

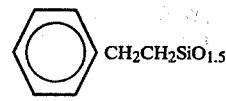

so as to provide a silicone resin which exhibits increased reactivity with organic compositions while also providing ultraviolet light and weathering resistance.

2. A silicone resin composition substantially free of α-phenylethylsiloxy units formed according to a process for producing silicone resins comprising the steps of (a) contacting 100 parts by weight alkyltrichlorosilane, dialkyldichlorosilane or mixtures thereof, wherein the alkyl groups have from 1 to about 8 carbon atoms, and from about 75 to about 1450 parts by weight β-phenyltrichlorosilane with from 0.05 to 1 part of water per part organochlorosilane and 0.1 to 1 part of an alcohol per part organochlorosilane, said alcohol having the general formula $R^3OH$, where $R^3$ is an alkyl radical of one to eight carbon atoms, such that there is formed an alkoxylated organosiloxane containing 5 to 40 percent by weight of alkoxy groups; (b) adding from 0.04 to 1 part of an alcohol per part of alkoxylated organochlorosiloxane, said alcohol having the formula $R^3OH$, where $R^3$ is as previously defined and removing acid from the alkoxylated organochlorosiloxane to an acid concentration of 500 to 4000 ppm; (c) adjusting the acidity of the alkoxylated organochlorosiloxane to 1 to 300 ppm; (d) adding from 0.04 to 1 part of water per part of said alkoxylated organochlorosiloxane to hydrolyze the alkoxylated organosiloxane; and (e) adjusting the resulting hydrolyzate to the desired solids content.

3. The composition of claim 2 wherein in step (a) there is added 0.05 to 0.2 parts of water and 0.1 to 0.4 parts of alcohol per part organochlorosilane and wherein the solution is carried out at room temperature.

4. The composition of claim 2 wherein in step (b) 0.04 to 0.1 part of alcohol is added per part alkoxylated organochlorosilane and wherein said acid is removed by distillation under vacuum.

5. The composition of claim 2 wherein in step (c) the acidity is adjusted by adding a base selected from the group consisting of KOH and NaOH.

6. The composition of claim 2 wherein in step (d) there is added 0.05 to 0.20 parts of alcohol per part alkoxylated organochlorosiloxane and 0.04 to 0.20 parts of water per part of said organosiloxane.

7. The composition of claim 2 wherein in step (e) the hydrolyzate is heated to a temperature in the range of 60° C. to 100° C. to remove all water and as much alcohol as is necessary to adjust the hydrolyzate to the desired solids content.

8. A solventless silicone resin composition substantially free of α-phenylethylsiloxy units formed according to a process comprising the steps of (a) adding to 100 parts by weight alkyltrichlorosilane, dialkyldichlorosilane or mixtures thereof, wherein the alkyl groups have from 1 to about 8 carbon atoms, and from about 75 to about 1450 parts by weight β-phenylethyltrichlorosilane, from 0.03 to 0.2 part water and from 0.1 to 1 part of an aliphatic alcohol having up to 3 carbon atoms per part organochlorosilane to form a silicon alkoxylate; (b) heating the alkoxylate to reflux; (c) inserting additional amounts of said aliphatic alcohol to said alkoxylate and removing said alcohol until the acid content of said alkoxylate is below 1000 parts per million; (d) adding an alkali metal hydroxide to said alkoxylate until its acid content does not exceed 100 parts per million; (e) adding water to said alkoxylate such that the amount of water that is added is from 0.2 to 0.8 moles of water per mole of hydrocarbonoxy radicals in said alkoxylate; and (f) heating said alkoxylate so as to effect the hydrolysis reaction with the additional water to obtain the desired resin product.

9. The composition of claim 8 wherein in step (c) there is added from 0.1 to 2 parts of aliphatic alcohol per part of alkoxylate and wherein said alkoxylate and alcohol mixture is heated to from 80° C. to 100° C. to strip off alcohol and HCl and wherein the step is repeated until the acid content is below 1000 parts per million.

10. The composition of claim 8 wherein step (e) the water is added in increments over a period of time varying from 0.5 to 3 hours.

11. The composition of claim 8 wherein the resin has an alkyl radical to silicon atom ratio that varies from 1.0 to 1.9:1, a silanol content that varies from 0 to 4% by weight and a hydrocarbonoxy content that varies from 7 to 14% by weight.

12. The composition of claim 8 wherein the resin has a viscosity at 100% solids which varies from 500 to 2,000 centipoise at 25° C.

13. The composition of claim 1 wherein the alkyl radicals are methyl radicals.

14. The composition of claim 2 wherein the alkyl radicals are methyl radicals.

15. The composition of claim 8 wherein the alkyl radicals are methyl radicals.

16. The composition of claim 1 wherein there is present from about 100 to about 350 parts by weight β-phenylethylsiloxane per 100 parts by weight alkylsiloxane.

17. The composition of claim 2 wherein there is present from about 100 to about 250 parts by weight β-phenylethyltrichlorosilane.

18. The composition of claim 8 wherein there is present from about 100 to about 250 parts by weight β-phenylethyltrichlorosilane.

* * * * *